(12) United States Patent
Meyrahn et al.

(10) Patent No.: US 12,171,241 B2
(45) Date of Patent: Dec. 24, 2024

(54) CLIPPING MACHINE WITH ENERGY RECOVERING

(71) Applicant: POLY-CLIP SYSTEM GMBH & CO. KG, Hattersheim (DE)

(72) Inventors: Joachim Meyrahn, Erzhausen (DE); Gerd Freiberger, Michelstadt-Vielbrunn (DE)

(73) Assignee: POLY-CLIP SYSTEM GMBH & CO. KG, Hattersheim (DE)

( * ) Notice: Subject to any disclaimer, the term of this patent is extended or adjusted under 35 U.S.C. 154(b) by 0 days.

(21) Appl. No.: 18/143,409

(22) Filed: May 4, 2023

(65) Prior Publication Data

US 2023/0354832 A1 Nov. 9, 2023

(51) Int. Cl.
*A22C 11/00* (2006.01)
*A22C 11/02* (2006.01)
*A22C 11/12* (2006.01)

(52) U.S. Cl.
CPC ............ *A22C 11/125* (2013.01); *A22C 11/02* (2013.01)

(58) Field of Classification Search
CPC .... A22C 11/125; A22C 11/02; A22C 11/0263
(Continued)

(56) References Cited

U.S. PATENT DOCUMENTS

2009/0007622 A1   1/2009   Golorons et al.
2014/0235150 A1*  8/2014   Niedecker .......... A22C 11/0227
                                                         452/37

(Continued)

OTHER PUBLICATIONS

EPO; Application No. 22171835.6; Extended European Search Report dated Oct. 25, 2022.

*Primary Examiner* — Richard T Price, Jr.
(74) *Attorney, Agent, or Firm* — Fitch, Even, Tabin & Flannery LLP

(57) ABSTRACT

The present invention relates to a clipping machine for producing sausage-shaped products, like sausages, by filling a flowable filling material into a tubular or bag-shaped packaging casing and closing said tubular or bag-shaped packaging casing by a closure device, like a closure clip, and a method for controlling the clipping machine. The clipping machine comprises a filling tube for feeding the filling material into the tubular or bag-shaped packaging casing stored on the filling tube and being closed at its first end, a casing brake assembly for applying a braking force to the tubular or bag-shaped packaging casing while being pulled-off from the filling tube, gathering means for gathering the filled tubular or bag-shaped packaging casing and for forming a plait-like portion thereto, the gathering device including a first displacer unit and a second displacer unit, a clipping device having a first and a second closing tool being reversibly movable between an opened position and a closed position, for applying at least one closure device to the plait-like portion and closing said closure device when the closing tools are in their closed position, and at least one drive device for driving at least one component of the clipping machine, including at least one electric motor. The clipping machine further comprises a motor driver unit adapted to operate the electric motor in an accelerating mode for increasing the speed of the electric motor, in a driving mode for maintaining the speed of the electric motor, and in an electric braking mode for decreasing the speed of the electric motor, and a control unit adapted to control the at least one motor driver unit such that during the braking mode electric braking energy is recovered.

15 Claims, 8 Drawing Sheets

(58) Field of Classification Search
USPC .......................................................... 452/48
See application file for complete search history.

(56) References Cited

U.S. PATENT DOCUMENTS

2017/0172164 A1* 6/2017 Ebert ..................... A22C 11/02
2019/0343135 A1 11/2019 Ebert et al.

* cited by examiner

CLIPPING MACHINE WITH ENERGY RECOVERING

CROSS-REFERENCE TO RELATED APPLICATION

The present application claims the benefit of priority of European Patent Application No. 22171835.6, filed on May 5, 2022, the content of which is incorporated herein by reference in its entirety.

FIELD OF THE INVENTION

The present invention relates to a clipping machine for producing sausage-shaped products, like sausages, by filling a flowable filling material into a tubular or bag-shaped packaging casing and closing said packaging casing by a closure means, like a closure clip, and a method for controlling said clipping machine. The present invention further relates to a system for producing sausage-shaped products, like sausages, that includes at least one clipping machine according to the present invention.

BACKGROUND ART

In practice, production machines or packaging machines, like clipping machines, are known, for producing sausage-shaped products, like sausages, in which filling material is fed into a tubular or bag-shaped packaging casing which is stored on a filling tube, and which is closed at its front end by at least one closure means, like a closure clip, i.e. the end of the packaging casing pointing in the feeding direction of the filling material. After a predetermined portion of filling material has been fed into the tubular or bag-shaped packaging casing, the filled tubular or bag-shaped packaging casing is gathered by gathering means, a plait-like portion being at least substantially free from filling material is formed thereto, and at least one first closure clip is placed and closed on said plait-like portion by a clipping device, for closing the portion of the tubular or bag-shaped packaging casing just filled. Additionally, at least one second closure clip may be placed for closing the front end of the sausage-shaped product to be produced next. For severing the sausage-shaped product just produced from the remaining supply of a tubular or bag-shaped packaging casing, a cutting device may be provided for cutting off the casing material between the first and second closure clip. The sausage-shaped product just produced may then be discharged from the clipping machine by a discharge device, like a belt conveyor, for further treatment, like cooking or smoking.

Components of these known clipping machines may be driven pneumatically, whereas other components are driven electrically. As central components, a clipping machine may include a main drive device, e.g. in the form of an electric motor, for commonly driving almost all components of the clipping machine, and/or single drive devices, that may also include electric motors, for separately and independently driving all components or the components not driven by the main drive device as for example a discharge conveyor belt. Furthermore, a clipping machine usually includes a control unit for controlling the clipping machine, particularly, by controlling the drives of the components.

A reliable and constant supply of electric energy, necessary for operating electric machines, may be difficult, particularly in regions where the power grid is not stable. In addition, it may be necessary to position clipping machines in specific areas of a factory, where the supply of electric energy requires specific precautions, like in wet areas. In these and similar situations, the risk exists that the power supply to the clipping machine may unexpectedly or accidentally be interrupted. Moreover, the power consumption of one or more clipping machines, particularly when starting the clipping machines or components thereof at the same time point, may cause voltage or current peaks in the power grid, which in the worst case, may collapse.

Furthermore, in the case of an interruption of the power supply, the clipping machine is immediately stopped. This may lead to an incorrect shut down of the clipping machine, and particularly, of its control unit, which may result in damages to components of the clipping machine, like the control unit.

SUMMARY OF THE INVENTION

Thus, it is an object of the present invention to provide a packaging machine, and in particular, a clipping machine for producing sausage-shaped products and a system including such a clipping machine, which can be operated reliably and safely, and with which a collapse in the power grid can be prevented.

According to the present invention, there is provided a clipping machine for producing sausage-shaped products, like sausages, by filling a flowable filling material into a tubular or bag-shaped packaging casing and closing said packaging casing by at least one closure means, like a closure clip, the clipping machine comprises a filling tube for feeding the filling material into the tubular or bag-shaped packaging casing stored on the filling tube and being closed at its first end, a casing brake assembly for applying a braking force to the tubular or bag-shaped packaging casing while being pulled-off from the filling tube, gathering means for gathering the filled tubular or bag-shaped packaging casing and for forming a plait-like portion thereto, the gathering means including a first displacer unit and a second displacer unit, a clipping device having a first and a second closing tool being reversibly movable between an opened position and a closed position, for applying at least one closure means to the plait-like portion and closing said closure means when the closing tools are in their closed position, and at least one drive device for driving at least one component of the clipping machine, including at least one electric motor. The clipping machine further comprises a motor driver unit adapted to operate the electric motor in an accelerating mode for increasing the speed of the electric motor, in a driving mode for maintaining the speed of the electric motor, and in an electric braking mode for decreasing the speed of the electric motor, and a control unit adapted to control the at least one motor driver unit such that during the braking mode electric braking energy is recovered.

The recovered braking energy may be provided to other components of the clipping machine, e.g. when operated in the accelerating mode. Thereby, the amount of electric energy demanded from the power grid, may be reduced, and an overload or collapse of the power grid, and thus, unnecessary down time of the clipping machine may be prevented.

The at least one drive device for driving at least one component of the clipping machine may be a main drive device that commonly drives a number of components of the clipping machine. In the case that the clipping machine includes a number of single drive devices for separately driving the components of the clipping machine, preferably the drive device with the highest expected output of recovered energy may represent the at least one drive device.

In an advantage embodiment, the clipping machine further comprising additional drive devices including further electric motors, for driving further components of the clipping machine, and further motor driver units, wherein the control unit is adapted to operate the plurality of motor driver units such that during a braking mode of one or more of the electric motors, the recovered electric braking energy is supplied to other electric motors operated in the accelerating mode or in the driving mode. In this configuration, the amount of recovered electric energy may be increased, and the amount of electric energy demanded from the power grid may be reduced accordingly.

Further according to the present invention, the clipping machine optionally comprises at least one storage device for storing the recovered electric braking energy, and for providing the recovered electric energy at a time point independent from the time point of the recovering process.

The storage device for storing the recovered electric braking energy may be realized in different ways. In one embodiment, the storage device may be integrally arranged in the clipping machine. This allows an efficient distribution of electric energy and a compact design of the clipping machine. Alternatively, or additionally, the storage device may be externally arranged to the clipping machine, and the clipping machine may have a connecting port or interface to which the externally arranged storage device may be coupled. An external arrangement of the storage device allows a simple exchange, e.g. in case of a defect, or for adapting the size or capacity of the storage device to the expected amount of recovered electric energy.

A storage device may include a rechargeable battery (e.g. lithium-ion battery) or capacitors (e.g. Gold-caps or Supercaps). It has further to be noted, that the arrangement of the storage device, internal or external to the clipping machine, may depend on the size of the storage device. Small-sized storage devices may easily be arranged inside the clipping machine, e.g. directly inside the control unit, whereas bulky storage devices may preferably be arranged externally, for a compact design of the clipping machine.

In order to prevent damages to the clipping machine, and particularly to its control unit, like by an uncontrolled shut down e.g. caused by a collapse of the power grid, it is of advantage that the control unit may be adapted to cause the recovered electric energy stored in the storage device to be supplied preferably with priority to the control unit. Thereby, an uninterruptible power supply, at least for the control unit, is realized, and a controlled shutdown of the clipping machine is enabled.

In a preferred embodiment of the inventive clipping machine, for efficient use the recovered electric energy, the control unit is adapted to cause the energy stored in the storage device to be supplied to at least one of the motor driver units.

In a further preferred embodiment, the control unit is adapted to cause the energy stored in the storage device to be preferably supplied to at least one of the electric motors, which is operated in the accelerating mode. Thereby, peak loads that may cause an overload or collapse of the power grid may be prevented.

The recovered electric energy may not only be used for driving components of the clipping machine. In an advantageous composition, the clipping machine includes at least one sensor device, and the control unit is adapted to cause the energy stored in the storage device to be supplied to the at least one sensor device. This ensures the functionality of said sensor devices also in the case of a collapse of the power grid, whereby damages to the clipping machine, e.g. caused by a collision of movable parts, may be prevented.

Such sensor devices may include various sensors, like position sensors for detecting the position, the presence or absence of machine components or elements, like the displacer units, the closing tools or a discharge device.

For further efficiently using the recovered electric energy, the control unit may be adapted to cause the electric braking energy while being recovered, or the recovered electric energy stored in the storage device, to be supplied to at least one other machine arranged upstream or downstream of the clipping machine. Thereby, the power consumption of the machines or apparatuses arranged upstream or downstream the clipping machine may be reduced. Naturally, said recovered energy may not only be supplied to the drive units of said machines, but also to respective sensors or sensor units and/or control units of said machine.

Machines or apparatuses arranged upstream or downstream the clipping machine may be fillers or detectors, like metal detectors, that usually are arranged upstream the clipping machine, or handling devices, like hanging lines, which are arranged downstream the clipping machine.

In the case that the inventive clipping machine is provided with an externally arranged storage device, it is of advantage that the externally arranged storage device is adapted to be coupled to further clipping machines. This enables the use of a storage device with a large capacity, which is charged by a plurality of clipping machines that recover electric braking energy. Thereby, said storage device will be charged also in the case of a malfunction of one of the plurality of clipping machines.

For enabling an effective operation of the clipping machine while using recovered energy, the clipping machine comprises a DC link, and the at least one motor driver unit is connected to the DC link. The DC link is fed with electric power from the power grid via a feed unit, which may be an unidirectional or a bidirectional AC/DC converter. The recovered energy may be supplied via said DC link to another motor driver unit or other components for using the recovered energy.

The storage device can be directly connected to the DC link, wherein the voltage of the DC link and the voltage of the storage device are the same. In this case, the control unit may be fed with electric DC power from the power grid directly via a power supply (unidirectional AC/DC converter), or with electric power from the DC link via an unidirectional DC/DC converter which converts the voltage of the DC link to the usually lower input voltage (DC power supply voltage) of the control unit. In an advantageous embodiment of the inventive clipping machine, the storage device is connected to the DC link via a bidirectional DC/DC converter, so that the voltage of the DC link and the voltage of the storage device may be different and a storage device having a lower voltage can be used. In this configuration, the electric power for the control unit may be provided by the DC link via an unidirectional DC/DC converter, wherein the voltage of the storage device and the input voltage of the control unit may be different. Alternatively, the control unit may directly receive recovered energy from said storage device, if directly coupled to the storage device, i.e. in parallel to the bidirectional DC/DC converter, wherein in this case the voltage of the storage device and the input voltage of the control unit are the same (e.g. 12 V or 24 V).

Further according to the present invention, there is provided a method for controlling a clipping machine for producing sausage-shaped products, like sausages. The method comprises the steps of feeding filling material into a tubular or bag-shaped packaging casing stored on a filling tube of the clipping machine and being closed at its first end, applying a braking force to the bag-shaped packaging casing while being pulled-off from the filling tube, by a casing brake assembly arranged on the filling tube, gathering the filled tubular or bag-shaped packaging casing and for forming a plait-like portion thereto by gathering means, the gathering means including a first displacer unit and a second displacer unit, applying at least one closure means to the plait-like portion and closing said closure means, by a clipping device having a first and a second closing tool being reversibly movable between an opened position and a closed position, and driving at least one component of the clipping machine by at least one drive device including at least one electric motor, and at least one motor driver unit adapted to operate the electric motor in an accelerating mode for increasing the speed of the electric motor, in a driving mode for maintaining the speed of the electric motor, and in an electric braking mode for decreasing the speed of the electric motor. The method further comprises the steps of controlling the clipping machine by a control unit, wherein the control unit is adapted to control the at least one motor driver unit such that during the braking mode electric braking energy is recovered.

Advantageously, method further comprises the step of storing the recovered electric braking energy in a storage device.

Furthermore, the present invention provides a system for producing sausage-shaped products, like sausages, which includes at least one clipping machine according to the present invention.

The inventive method for controlling a clipping machine as well as the inventive system thereby provide all advantages explained in conjunction with the clipping machine according to the present invention.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
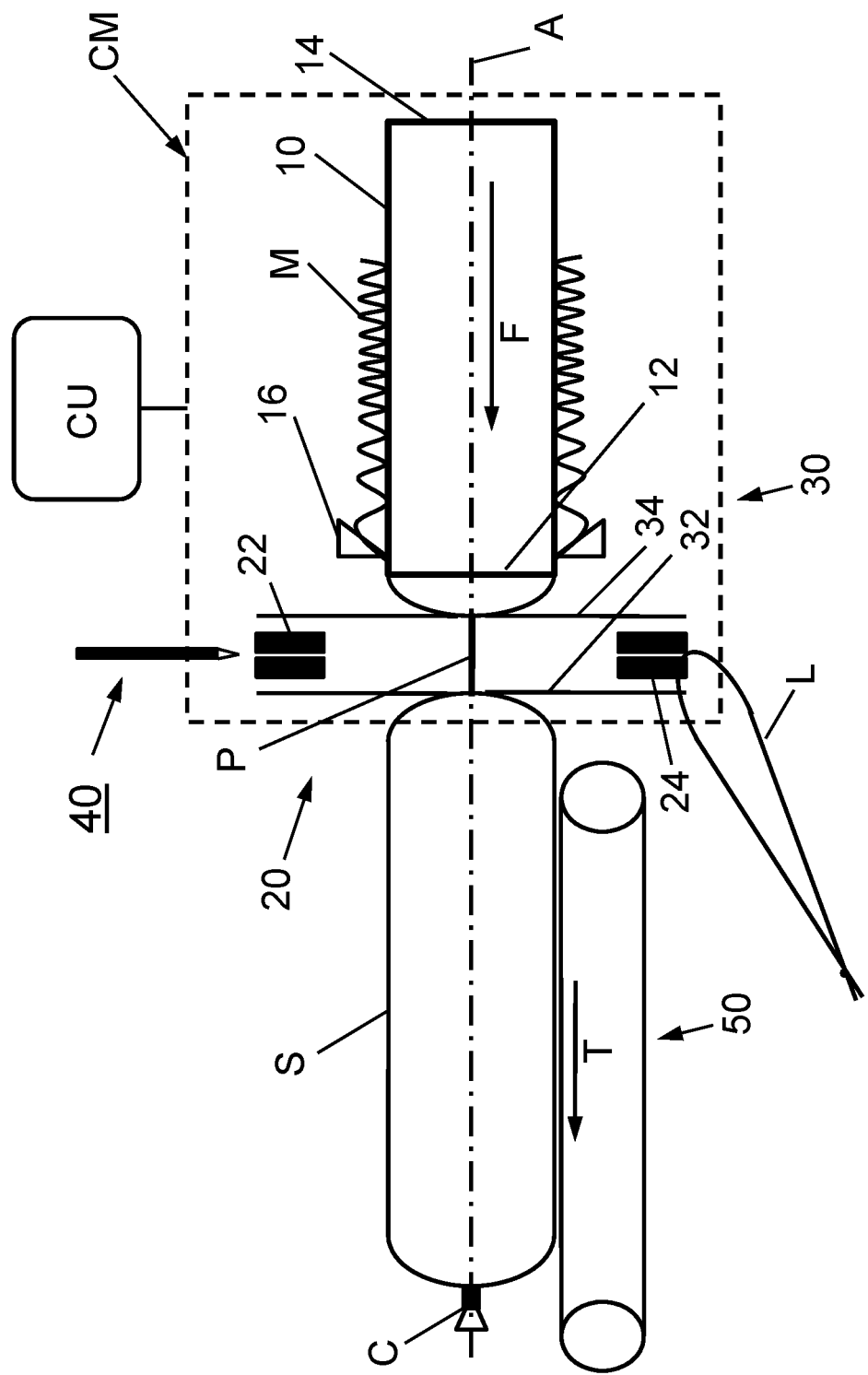
FIG. 1: is a schematic view showing the principal design of a clipping machine for producing sausage-shaped products.

A production machine or clipping machine CM for producing sausage-shaped products S, like sausages, which contain a flowable filling material in a tubular or bag-shaped packaging casing M, is shown schematically in FIG. 1, in particular its closing region. Clipping machine CM comprises a filling tube 10 having a longitudinally and horizontally extending central axis A, with a discharge opening for discharging the filling material at its left end 12 and a feeding opening for feeding the filling material into filling tube 10 in a feeding direction F to the discharge opening of filling tube 10, for example by a feeding pump P of a filler 300 (cf. FIG. 7), at its right end 14. Moreover, a casing brake assembly 16 is arranged on and coaxially with filling tube 10 in the region of left end 12 of filling tube 10. Filling tube 10 is made of a suitable material, like stainless steel.

A supply of tubular packaging casing M made of a thin sheet material is stored on filling tube 10 in a folded manner like a concertina. From the supply of tubular packaging casing M, tubular packaging casing M is pulled-off during the process of producing sausage-shaped products S, in particular by the feeding pressure for filling the filling material into tubular packaging casing M, wherein casing brake assembly 16 provides a braking force for allowing a controlled pulling-off of tubular packaging casing M during the filling process.

Clipping machine CM further comprises a clipping device 20 for closing a filled portion of tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing just filled tubular packaging casing M, or may apply and close two or more closure clips C at the same time, a first closure clip C for closing the rear end of just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

If it is intended to store sausage-shaped products S on a rod-like element, like a smoking rod, e.g. for further processing like cooking or smoking, a suspension element L, like a suspension loop, may be provided and attached to one end of each of sausage-shaped products S, or at one end of a chain of sausage-shaped products. Suspension element L may be fed to one of closing tools 22, 24, and may be fixed to the respective end of sausage-shaped product S by means of closure clip C that closes said end of sausage-shaped product S.

For separating sausage-shaped product S just produced from the remaining supply of tubular packaging casing M stored on filling tube 10, a cutting device 40 may be provided. Said cutting device 40 cuts the tubular packaging casing M upstream closure clip C that closes the just filled portion of tubular packaging casing M. In case that two closure clips C have been applied to plait-like portion P by clipping device 20, cutting device 40 cuts plait-like portion P between said two closure clips C.

For discharging a sausage-shaped product S just produced from clipping machine CM in a transportation direction T being at least substantially the same as feeding direction F, a discharge device 50 is arranged downstream clipping device 20, which may be a belt conveyor comprising a conveyor belt and guide rollers.

For storing sausage-shaped products S on a rod-like element, suspension element L is caught by a catching device (not shown), like a catching needle, which guides suspension element L towards the rod-like element.

Clipping machine CM further comprises a control unit CU for controlling clipping machine CM, and one or more drive devices DD (cf. FIGS. 2 to 7) for driving the components of clipping machine CM, like e.g. first and second clipping tool 22, 24 of clipping device 20, first and second displacer unit 32, 34 of gathering means 30 and other components or assemblies of clipping machine CM that require a drive unit. The one or more drive units may be coupled to and controlled by control unit CU.

Control unit CU may also control additional components or machines, which are not part of clipping machine CM, but being involved in the production process. In particular, control unit CU may control the drive units of said additional components or machines. Filler 300 (cf. FIG. 7) may be arranged upstream clipping machine CM, and includes pump P for feeding filling material into filling tube 10. Additionally, a metal detector may be provided in the region of filling tube 10, for detecting metal parts in the filling material while fed into tubular packaging casing M, or a label feeding device for feeding labels to clipping device 20 for being attached to the sausage-shaped product S. These and other additional components and machines may be coupled to control unit CU and controlled by control unit CU to be adjusted to each other and the kind of sausage-shaped product S to be produced by clipping machine CM.

Figure 2:
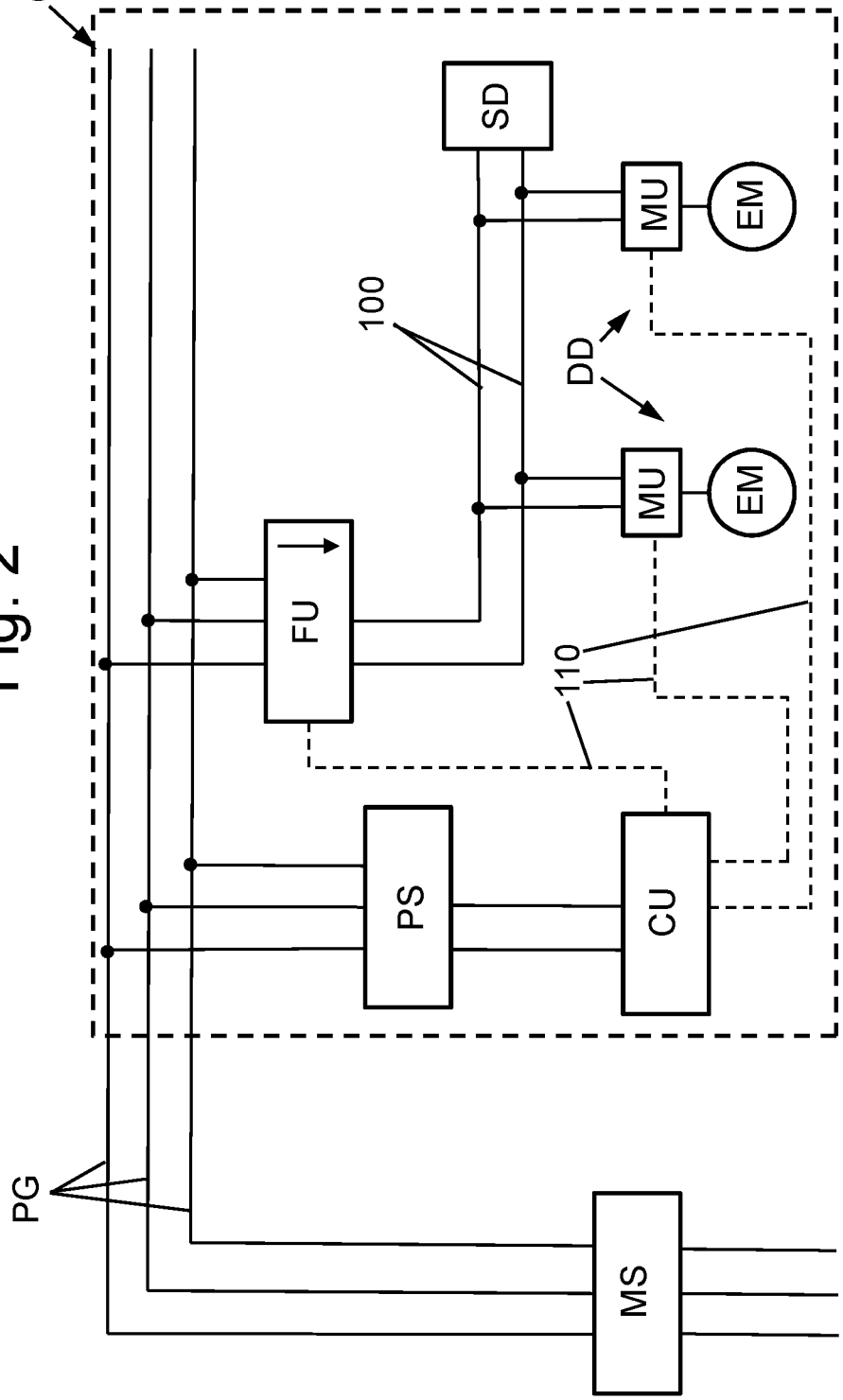
FIG. 2: is a circuit diagram of a clipping machine according to a first embodiment according to the present invention.

FIG. 2 is a circuit diagram of a clipping machine according to a first embodiment the present invention.

Clipping machine CM according to the first embodiment includes drive devices DD for driving components of clipping machine CM, like clipping device 20 or gathering means 30, a control unit CU for controlling at least the function of drive devices DD, a power supply unit PS for supplying electric power to control unit CU and a feed unit FU for feeding electric power to the components of clipping machine CM, like drive devices DD. Feed unit FU and drive devices DD are interconnected via a DC link 100. For providing DC power to drive units DD, feed unit FU includes an unidirectional AC/DC converter for converting AC power (alternating current) received from a power grid PG, into DC power (direct current). Power supply PS for supplying energy to control unit CU is also coupled to power grid PG, and may also include an unidirectional AC/DC converter for providing DC power to control unit CU. A main switch MS is arranged in power grid PS for connecting clipping machine CM to or disconnecting clipping machine CM from power grid PG.

A drive device DD includes an electric motor EM for driving the respective component of clipping machine CM, like clipping device 20. Motor driver unit MU, which controls electric motor EM, may operate electric motor EM in an accelerating mode with increasing speed, a driving mode with approximately constant speed and a braking mode with decreasing speed, as required by the respective production process. At least in the braking mode, when electrically braking the electric motor EM by using the electric motor as a generator, electric energy may be recovered by motor driver unit MU and fed back into DC link 100.

As it further can be seen in FIG. 2, a storage device SD is connected to DC link 100. Storage device 100 includes a battery or a capacitor or the like that can be charged via DC link 100 by the electric energy recovered from drive devices DD and fed back into DC link 100. The recovered electric energy stored in storage device SD, may be supplied to components of the clipping machine such as other drive devices being operated in the driving mode or in the acceleration mode. In this embodiment, storage device SD is directly coupled to DC link 100. Accordingly, the kind of battery or capacitor or the like has to be adapted to DC link 100, particularly with regard to the height of voltage on DC link 100.

Control unit CU may be adapted to cause the recovered energy stored in storage device SD to be supplied with priority to specific components, like components that are operated in the acceleration mode. Supplying recovered energy to components that currently are operated in the accelerating mode may reduce the amount of energy received from power grid PG, and may reduce peak loads in power grid PG.

For controlling clipping machine CM, and particularly drive devices DD, control unit CU is connected to feed unit FU and motor driver units MU by respective control lines or control wires 110.

Figure 3:
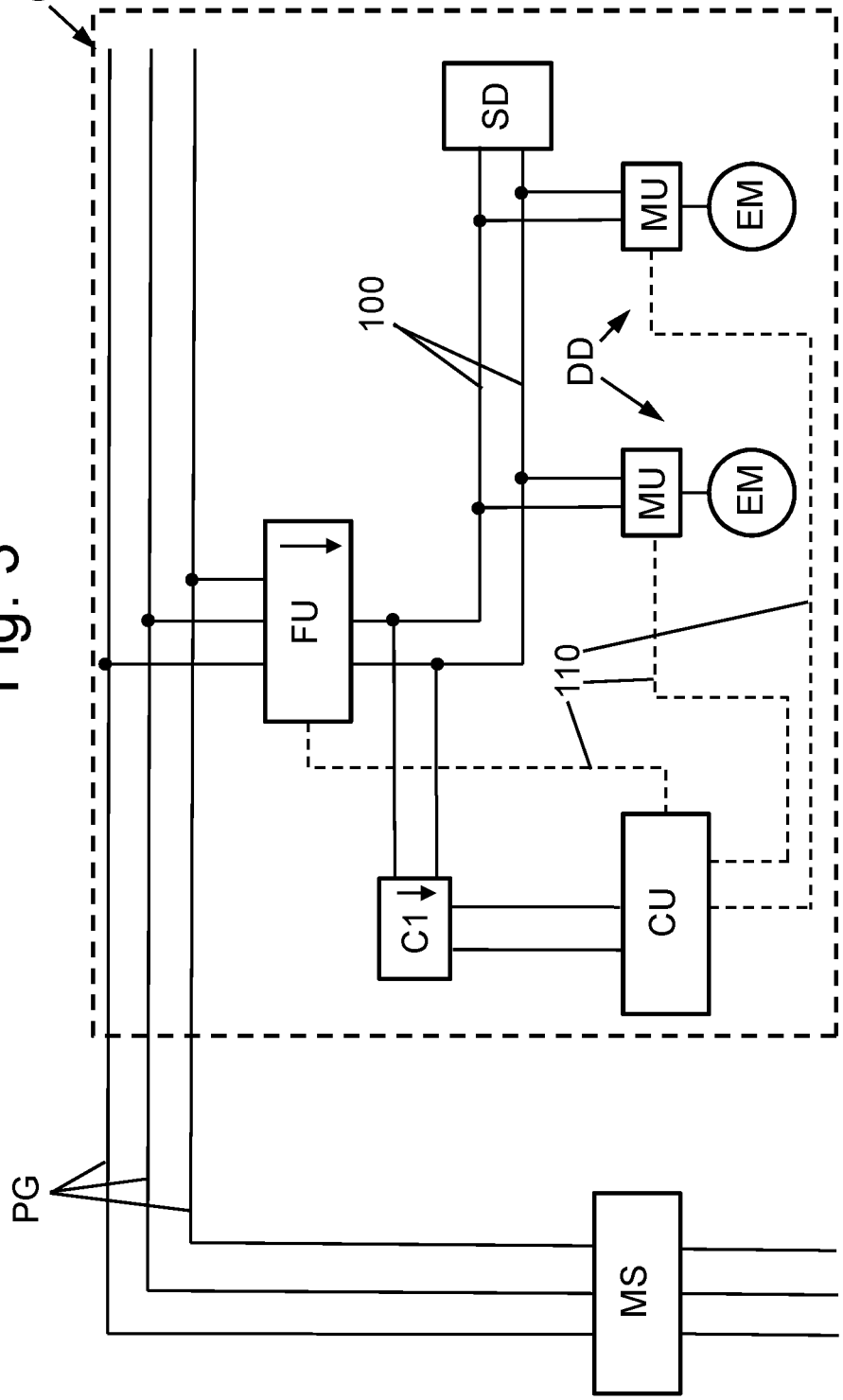
FIG. 3: is a circuit diagram of a clipping machine according to a second embodiment according to the present invention.

A second embodiment of inventive clipping machine CM is shown in FIG. 3. Clipping machine CM of FIG. 3 differs from clipping machine CM of FIG. 2 in that control unit CU is not coupled to power grid PG via power supply PS, but to DC link 100 via a unidirectional DC/DC converter C1 for receiving electric energy from DC link 100.

In this embodiment, energy recovered by drive devices DD and stored in storage device SD, may be supplied via DC link 100 to control unit CU. Thereby, a separate power supply PS for control unit CU may be omitted, and control unit CU can be fed with power for a certain time period even if power grid PG is interrupted or fails.

Figure 4:
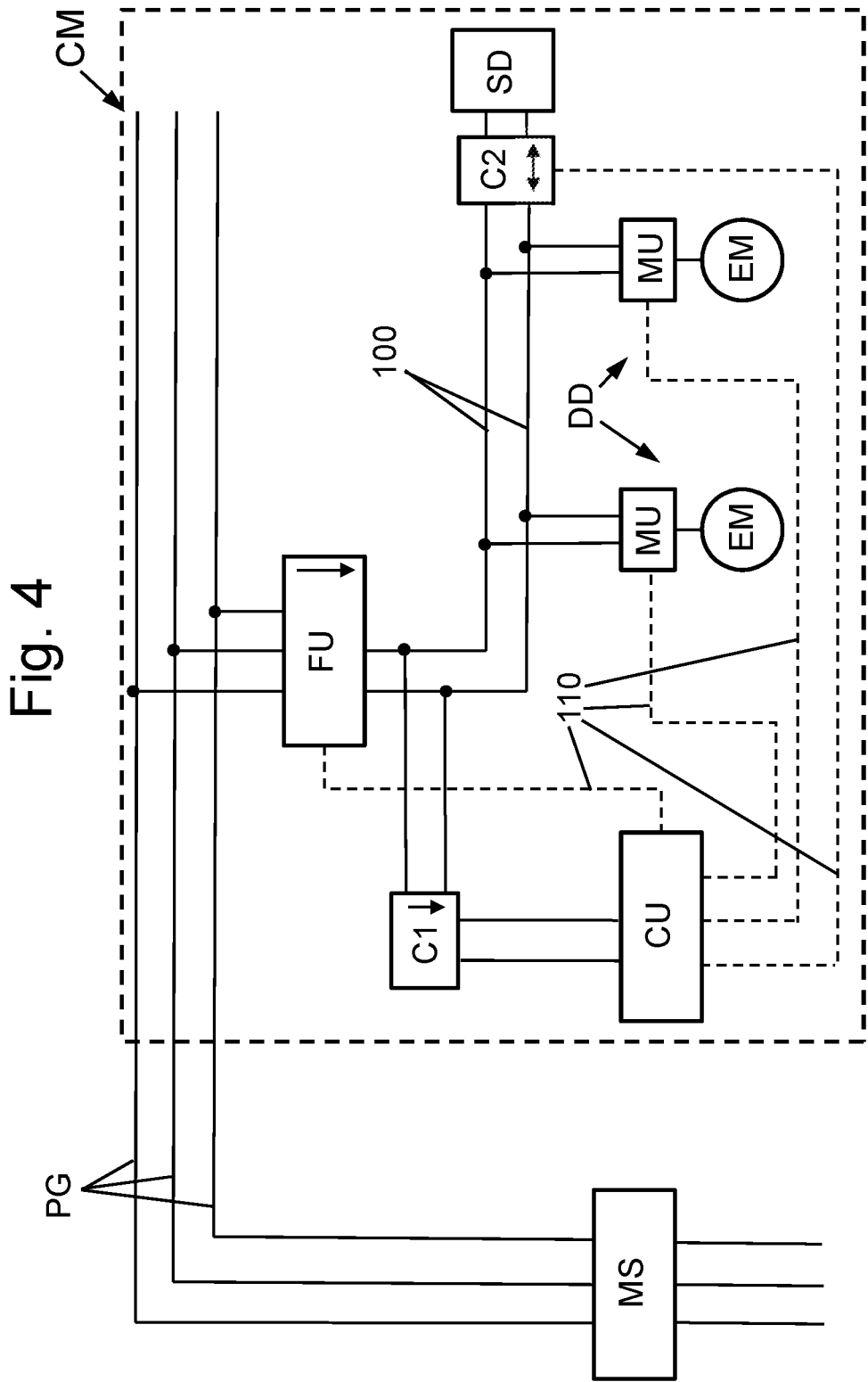
FIG. 4: is a circuit diagram of a clipping machine according to a third embodiment according to the present invention.

Clipping machine CM according to a third embodiment, as shown in FIG. 4, corresponds to clipping machine CM of the second embodiment, with control unit CU connected via unidirectional DC/DC converter C1 to DC link 100.

In the third embodiment, DC link 100 is connected to a bidirectional DC/DC converter C2 for connecting storage device SD to DC link 100. An additional control wire 110 is provided, that connects control unit CU to bidirectional DC/DC converter C2 to cause the recovered energy from the at least one drive device DD to be stored into storage device SD, or to cause the energy stored in storage device SD to be delivered to DC link 100, or to prevent any flow of energy through bidirectional DC/DC converter C2. When delivering energy from storage device DC to DC link 100, the energy stored in storage device SD can be supplied to respective components of clipping machine CM, and preferably with priority e.g. to control unit CU or to a certain drive device DD. This may be accomplished, for example, by timely activating bidirectional DC/DC converter C2 such that it feeds a desirable amount of power from storage device SD to DC link 100, wherein simultaneously the output voltage of bidirectional DC/DC converter C2 is limited to a maximum voltage which is by a certain (but preferably small) amount higher than the normal output voltage provided by feed unit FU. In this way, the power delivered by bidirectional DC/DC converter C2 to DC link 100 decreases below the desirable amount of power when the power demand on DC link 100 decreases below said desirable amount of power, due to the limited output voltage of bidirectional DC/DC converter C2. Accordingly, feed unit FU does not feed any power to DC link 100 as long as the power demand on DC link 100 caused by the entirety of consumers (e.g. drive devices DD, control unit CU etc.) is not larger than said desirable power delivered by bidirectional DC/DC converter C2, since the voltage on DC link 100 is higher than the normal output voltage of feed unit FU so that feed unit FU is prevented from feeding power to DC link 100. If, however, the power demand on DC link exceeds said desirable power delivered from bidirectional DC/DC converter C2, the voltage on DC link drops to the normal output voltage of feed unit FU which then provides the residual power needed to satisfy the power demand. In this way, a controllable amount of power and/or a controllable amount of electric energy can be extracted from storage device SD and delivered to DC link 100 during a controllable time period, so the flow and the usage of the energy stored in storage device SD can be controlled arbitrarily and selectively.

The arrangement of bidirectional DC/DC converter C2 between DC link 100 and storage device SD also enables to convert energy recovered by drive devices DD and supplied to storage device SD into a suitable format, particularly regarding the voltage level according to the kind of storage device SD, and to reconvert the energy stored in storage device SD into a format required by DC link 100. Accordingly, a large variety of batteries may be used, independently from the format of voltage and current supplied via DC link 100. This third embodiment is also preferred for safety reasons if an external storage device SD is used, so that the connection port for connecting storage device SD has a low voltage (lower than the voltage on DC link 100 which usually may be e.g. 400 V, and preferably lower than 60 V, more preferably not more than 24 V) suitable for wet operating environments of the clipping machine.

Control wires 110 in general, and in particular control wire 110 that connects control unit CU to bidirectional DC/DC converter C2, enable a controlled distribution of energy, in particular recovered energy to and from the components of clipping machine CM, like between storage device SD and drive devices DD, dependent on the current operation mode of these components. Instead of using unidirectional DC/DC converter C1, also in the third embodiment control unit CU may alternatively supplied by power supply SP connected to power grid PG as shown in FIG. 2. In this case, the energy from storage device SD cannot delivered to control unit CU.

Figure 5:
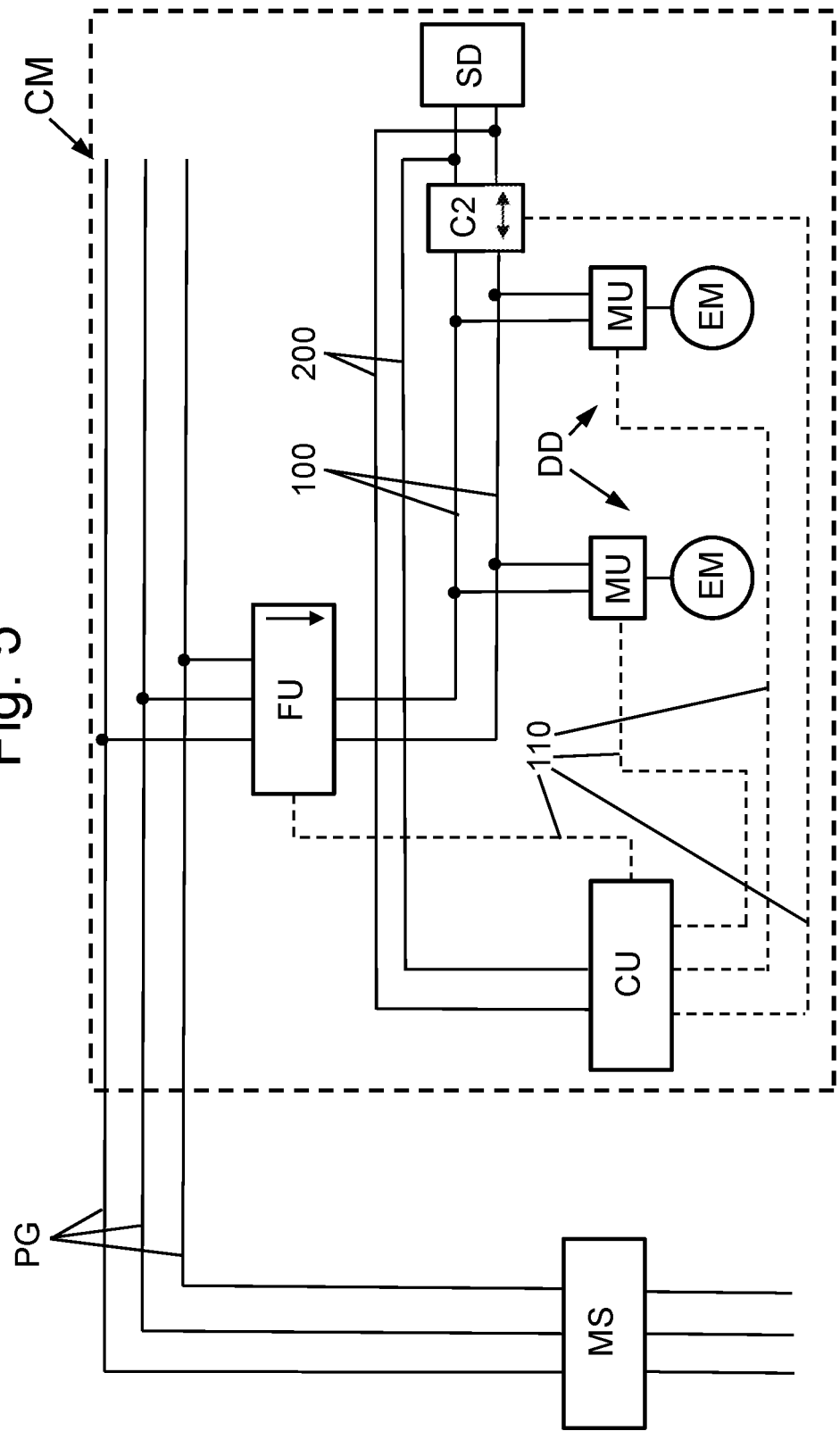
FIG. 5: is a circuit diagram of a clipping machine according to a fourth embodiment according to the present invention.

FIG. 5 shows a fourth embodiment of clipping machine CM of the present invention. In this embodiment, drive devices DD and storage device SD are connected to DC link 100 as in clipping machine CM according to the third embodiment shown in FIG. 4. Also, control wires 110 are provided for connecting control unit CU to feed unit FU, drive devices DD and bidirectional DC/DC converter C2. In the fourth embodiment of clipping machine CM, the power supply for control unit CU is realized by a power supply line 200 that is directly connected to storage device SD, in particular to the connecting line between storage device SD and bidirectional DC/DC converter C2.

In this embodiment, control unit CU is directly powered by storage device SD which delivers previously stored recovered energy or simultaneously receives energy recovered by any of the drive devices DD. Additionally, in the case that currently no energy is recovered and/or storage device SD is empty, energy may be supplied to control unit CU from by power grid PG via feed unit FU, DC link 100 and unidirectional DC/DC converter C2. In the fourth embodiment, power supply PS and unidirectional DC/DC converter C1 are not required, so that the system can be made less complex and costs can be reduced.

Figure 6:
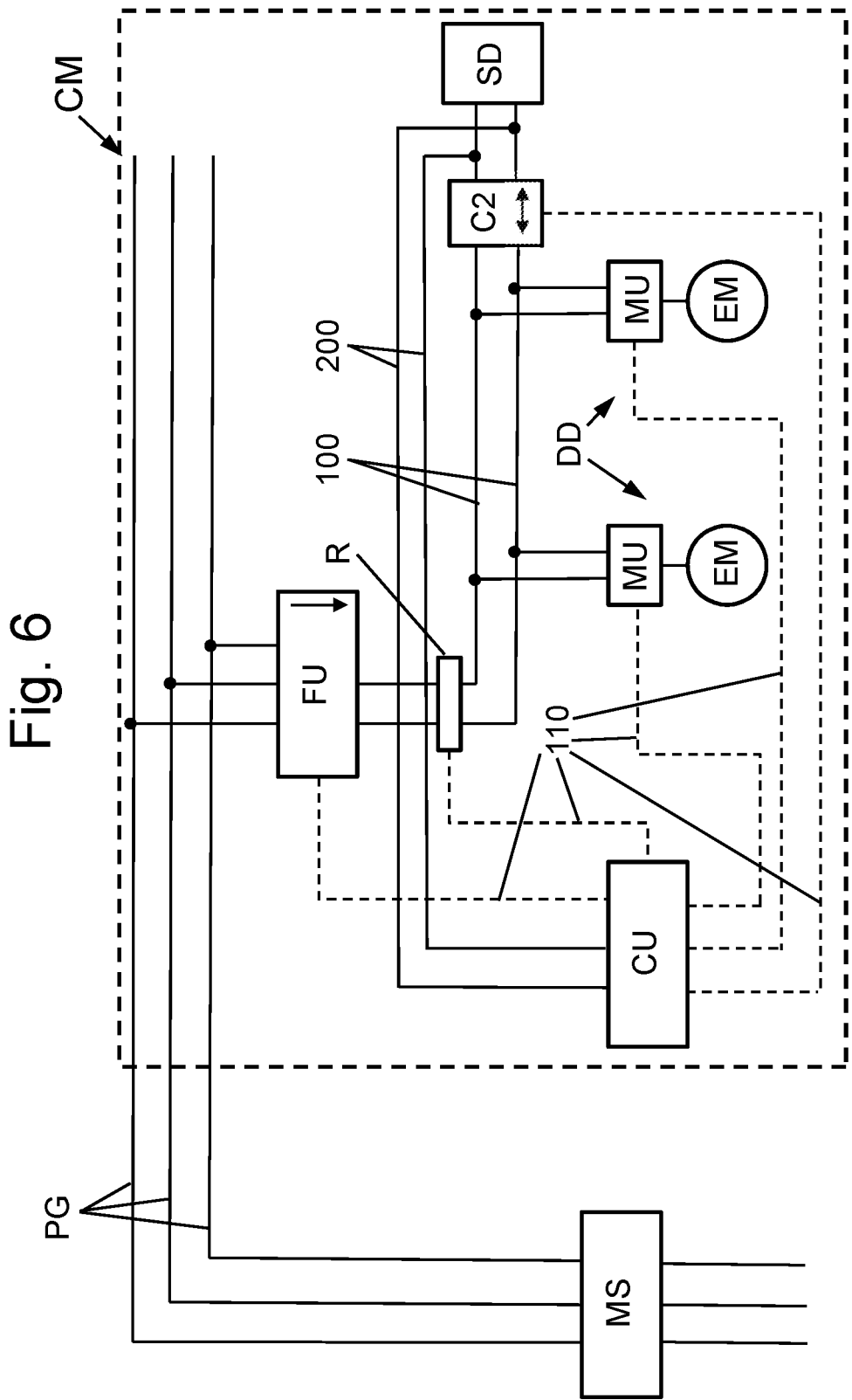
FIG. 6: is a circuit diagram of a clipping machine according to a fifth embodiment according to the present invention.

A fifth embodiment of a clipping machine CM according to the present invention is shown in FIG. 6. Clipping machine CM of this embodiment includes all components and elements explained in conjunction with the fourth embodiment. Additionally thereto, clipping machine CM according to FIG. 6 includes a controllable resistor R that is connected to DC link 100 and serves as a braking resistor. Resistor R is further connected to control unit CU by a control wire 110. In the case that the electric energy currently recovered, cannot be stored in storage device SD, e.g. when the same is fully loaded, or used by drive devices DD since none of drive devices DD is in a driving mode or an accelerating mode, said recovered energy can be absorbed by resistor R and converted into heat. Thereby, an overload or instability of the electric system of clipping machine CM can be prevented.

According to the second to fifth embodiments of clipping machine CM, control unit CM may receive energy from DC link 100. Energy recovered by drive devices DD is stored in storage device SD to be provided to various components of clipping machine CM. Alternatively to storage device SD that is coupled to DC link 100, a storage device may integrally be arranged in control unit CU, e.g. in the form of respective capacitors, like so called Gold-capacitors or super caps (not shown). The capacity of such an integrated storage device is sufficient to secure a controlled shut down of clipping machine CM, and particularly of control unit CU, e.g. in the case of an accidental shutdown of power grid PG. However, the capacity of such an integrated storage device may be too small to store all energy being recovered in clipping machine CM, such that said recovered energy, at least partially, has to be converted into heat by resistor R.

Even if not shown, it has to be understood, that resistor R that is controlled by control unit CU may be provided in all embodiments of clipping machine CM according to the present invention, such that, if necessary, surplus recovered energy, that e.g. may not be stored or directly reused, can be absorbed by resistor R.

Figure 7:
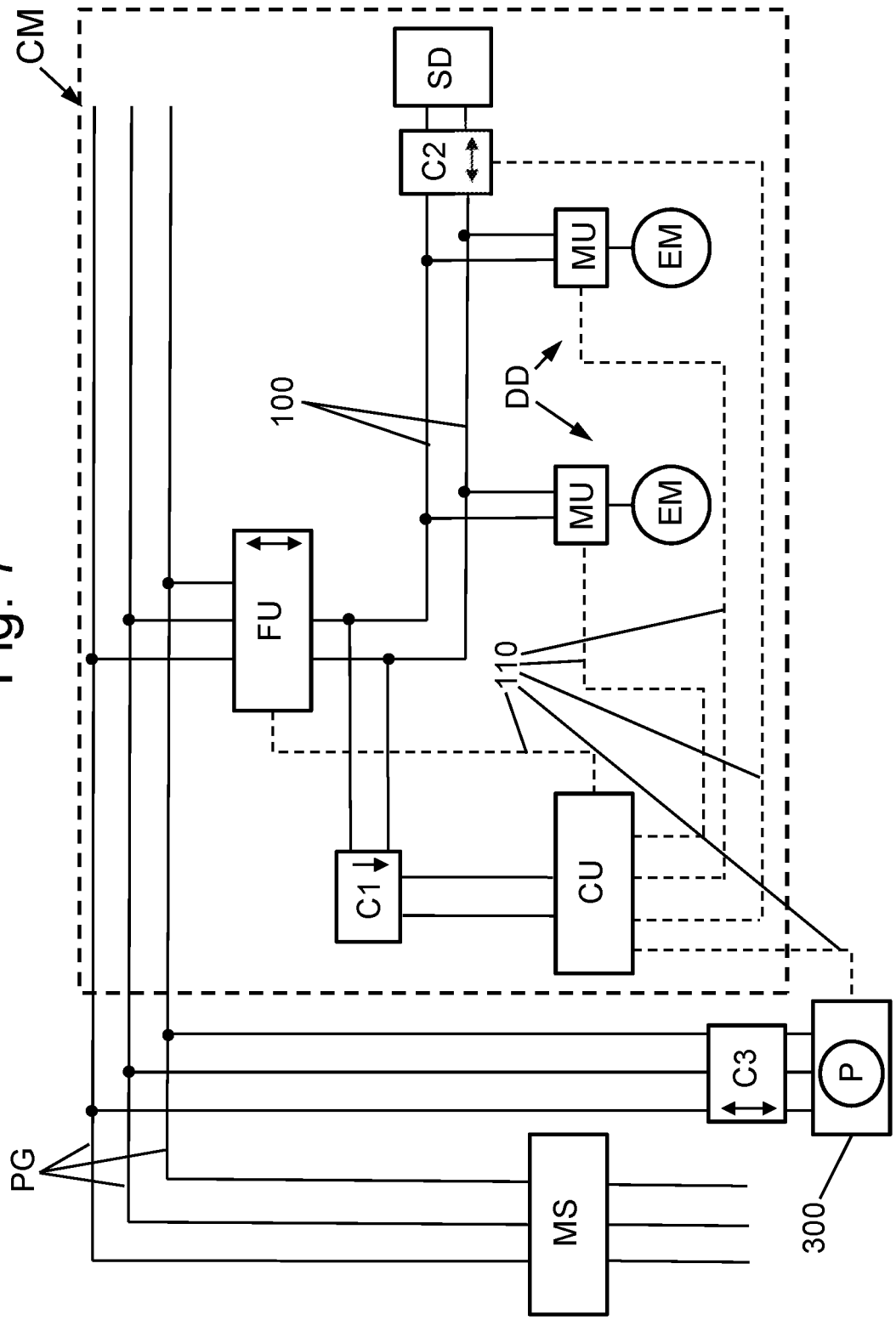
FIG. 7: is a circuit diagram of a clipping machine according to a sixth embodiment according to the present invention.

A sixth embodiment of a clipping machine according to the present invention is shown in FIG. 7. Clipping machine CM of the sixth embodiment preferably has a basic configuration as explained in conjunction with the third embodiment (FIG. 4), but may also have a basic configuration according to one of the embodiments shown in FIG. 2. 3, 5, or 6).

As shown in FIG. 7, clipping machine CM includes DC link 100 to which drive devices DD are connected for supplying energy thereto, and for receiving recovered electric energy that may be stored in storage device SD connected to DC link 100 by bidirectional DC/DC converter C2. Furthermore, control unit CU is connected via unidirectional DC/DC converter C1 to DC link 100 for receiving energy via DC link 100. Control wires 110 connect control unit CU to feed unit FU, drive devices DD and to bidirectional DC/DC converter C2 to cause the energy stored in storage device SD to be supplied to respective components of clipping machine CM.

In contrast to the preceding embodiments, feed unit FU for supplying energy (or power) to DC link 100 is implemented as a bidirectional converter (as indicated by the double arrow in FIG. 7). That means, feed unit FU may receive energy from power grid PG for supplying energy to the components of clipping machine CM, and feed unit FU may feed electric energy recovered by the components of clipping machine CM, like drive devices DD, back to power grid PG. The recovered electric energy that is fed back into power grid PG, may be used by other machines coupled to power grid PG. Thereby the power consumption of the whole production system may be reduced. Alternatively, the recovered energy may be fed back into a public power grid, and e.g. may be refunded.

As it further can be seen in FIG. 7, a filler 300 including a pump P for feeding filling material into filling tube 10 of clipping machine CM is provided. Clipping machine CM and filler 300, together with further possible machines like a hanging line, form a system for producing sausage-shaped products.

Filler 300 is connected to power grid PG for receiving energy for driving pump P. Control unit CU is connected via a further control wire 110 to a control unit within filler 300 for controlling filler 300 as requested by clipping machine CM, e.g. for being adapted to a specific product to be produced and to detect the current operation mode of filler 300. A bidirectional power converter C3 is arranged between filler 300 and power grid PG, wherein preferably the bidirectional power converter C3 is a feed unit similar to feed unit FU of the clipping machine. Said power converter C3 enables filler 300 to feed electric energy, which is recovered when operated in a braking mode, back into power grid PG. Said electric energy recovered by filler 300 may e.g. be used by clipping machine CM via feed unit FU.

According to the sixth embodiment of clipping machine CM, filler 300 is coupled via bidirectional power converter C3 to power grid PG. The energy recovered by filler 300 is fed back to power grid PG. Alternatively, but not shown, it is possible to couple a DC link within filler 300 via an unidirectional or bidirectional DC/DC converter to DC link 100 of clipping machine CM. The electric energy recovered by filler 300 can thereby directly provided to clipping machine CM via DC link 100, and vice versa, and may be used by respective components of clipping machine SM or may be stored in storage device SD. For controlling the energy flow between filler 300 and clipping machine CM such that an optimal usage of recovered energy can be achieved, e.g. for preventing peak loads on the public power grid or for increasing overall efficiency etc., the control wire 110 between control unit CU of clipping machine CM and the control unit of filler 300 can be used. In this case, one of control unit CU of clipping machine CM and the control unit within filler 300 can be operated in a master mode responsible for controlling the energy flow between filler 300 and clipping machine CM, and the other can be operated in a slave mode. In other words, either filler 300 or clipping machine CM may control the energy flow between these devices.

Clipping machines CM explained in conjunction with FIGS. 2 to 7, preferably include a storage device SD that is integrated in clipping machine CM, such as a battery connected to DC link 100 or integrated in control unit CU. By using an integrated storage device SD, clipping machine CM is a stand-alone unit in which electric energy may be recovered and reused. Alternatively, recovered energy may be fed back into power grid PG, if feed unit FU is a bidirectional AC/DC converter. In this case, storage device SD can be omitted, which is particularly advantageous in the sixth embodiment when the other machine of the system, such as filler 300, comprises a storage device that is also suitable and adapted to store the recovered energy provided by clipping machine CM.

Figure 8:
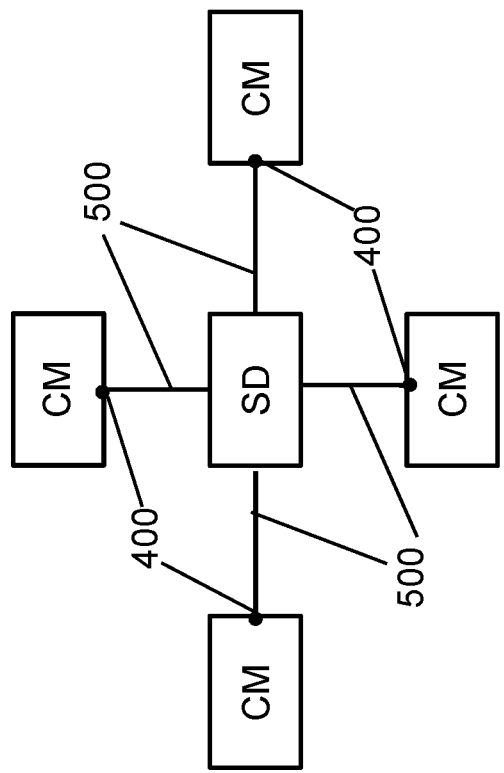
FIG. 8: is a schematic view of a group of a clipping machine according to the present invention.

FIG. 8 is a schematic view of a group of a clipping machines CM according to the present invention in combination with an externally arranged storage device SD.

Clipping machines CM are arranged in a group, with each clipping machine CM being connected to power grid PG (not shown in FIG. 8). An externally arranged storage device SD is provided, to which each clipping machine CM is connected. Each clipping machine CM is provided with a connecting port or interface 400 via which externally arranged storage device SD may be coupled to clipping machines CM by a respective power cable 500. In this manner externally arranged storage device SD may be connected to DC links 100 of clipping machines CM via respective bidirectional DC/DC converters C2 as shown e.g. in FIG. 4, such that energy recovered by the components of clipping machine CM, like drive devices DD, may directly be stored in and reused from externally arranged storage device SD.

In this configuration, the size of storage device SD may be selected independently from the size or configuration of clipping machine CM. Furthermore, said externally arranged storage device SD may easily be exchanged by another storage device, like a storage device with a larger or smaller capacity, e.g. in adaption to the number of clipping machines CM, or for maintenance.

For producing a sausage-shaped product S on clipping machine CM, tubular casing material M stored on filling tube 10 and closed at its front end by a closure clip C, is filled with filling material which is fed through filling tube 10 into tubular casing M in feeding direction F. After a predetermined portion of filling material is fed into tubular casing M, upper and lower displacer elements of first and second displacer units 32, 34 are moved from their opened position into their closed position for forming a gathered portion to the filled tubular casing M. Thereafter, first displacer unit 32 carries out a linear movement in a horizontal direction and coaxially to feeding direction F. Thereby, a plait-like portion P is formed to the gathered portion of tubular casing material M, and two closure clips C are applied to plait-like portion P and closed by clipping device 20, a first closure clip C for closing the just filled tubular casing M for forming a sausage-shaped product S and a second closure clip C for closing the front end of sausage-shaped product S subsequently to be produced. A suspension element L may be provided and attached to one end of sausage-shaped product S by means of one of the closure clips C. For severing the just produced sausage-shaped product S from the remaining supply of tubular packaging casing M, cutting device 40 is activated, such that plait-like portion P is cut between the two closure clips C, and the sausage-shaped product S just produced may be discharged from clipping machine CM by discharge device 50.

Clipping machine CM is provided with drive devices DD, which include electric motors EM for driving components of clipping machine CM. During the production process, said components may be operated in different modes, like an accelerating mode in which the speed of electric motor EM is increased, a driving mode for maintaining the speed of electric motor EM, and a braking mode more precisely an electric braking mode for decreasing the speed of electric motor EM. Such a component may be clipping device 20, closing tools 22, 24 of which are accelerated while being moved towards each other, and which are then immediately slowed down while closing closure clip C. Another component may be gathering means 30 with first and second displacer units 32, 34, the displacer elements of which are accelerated and slowed down while being reversibly moved towards each other for forming plait-like portion P to the filled tubular casing material M.

During operating one or more of drive devices DD of the components of clipping machine CM in the electric braking mode, controlled by control unit CU, electric energy is recovered and fed back to DC link 100. Via DC link 100, the recovered energy may be delivered to storage device SD, which may include an internally or externally arranged battery, for being stored therein. Control unit CU causes energy stored in storage device SD to be supplied to components of clipping machine CM, which are operated in the accelerating mode and/or in the driving mode.

Various modes for distributing recovered energy to the components of clipping machine CM may be provided. Generally, recovered energy may be distributed to all components that currently are in operation and require electric energy. Alternatively, control unit CU can cause recovered energy stored in storage device SD to be supplied with priority to specific components. These preferred components may be such components that are currently operated in the accelerating mode, for preventing load peaks in power grid PG. Furthermore, components that have the highest demand for energy may preferably be provided with energy stored in storage device SD, for reducing the amount of energy received from power grid PG. Further alternatively, it is possible to supply energy stored in storage device SD with priority to control unit CU, such that in case of an accidental shutdown of power grid PG, clipping machine CM may be shut down in a regular manner by control unit CU. Thereby, it is ensured that all components of clipping machine CM are moved into predefined positions, and accidents and malfunctions during restart of clipping machine CM are prevented.

In a further mode for distributing energy stored in storage device SD, control unit CU can cause energy to be supplied with priority to sensor devices of clipping machine CM. Such sensor devices may be provided for monitoring the movement of components of clipping machine CM, and/or for determining their current position and their presence or absence in predefined position, e.g. when starting clipping machine CM or during the production process. Thereby, damages to sausage-shaped products S or clipping machine CM may be prevented. Such sensor devices may also detect the presence or absence of materials, like tubular casing material M on filling tube 10. Providing the sensor devices of clipping machine CM with recovered energy stored in storage device SD ensures their functionality, also in case of an accidental shutdown of power grid PG. To this purpose, the sensor devices, or other devices to be preferably supplied by recovered energy, are preferably directly connected to storage device SD which in turn is connected to DC link 100 via bidirectional DC/DC converter C2, similar to control unit CU connected via line 200 to storage device SD shown in FIG. 5.

Furthermore, dependent on the size of storage device SD, particularly during a short downtime of power grid PG, storage device SD may function as an emergency power generator or emergency power source, for maintaining the production process, whereby damages and losses may be prevented.

Dependent on the kind of clipping machine CM, e.g. with regard to the number of drive units, or the kind of products to be produced, which affect the operating mode and timing of the components of clipping machine CM, the amount of recovered energy may vary. Accordingly, regarding the expected amount of recovered energy, the mode for distributing recovered energy to the components of clipping machine CM may be selected. That means, in case the expected amount of recovered electric energy is small, it may be preferred that recovered energy stored in storage unit SD is supplied with priority to control unit CU. On the other hand, if the expected amount of recovered electric energy is high, recovered energy may be supplied to drive devices DD of the components of clipping machine CM, e.g. with priority to such drive devices DD that are operated in the accelerating mode.

As already explained, control unit CU may be provided with an integrated storage device, e.g. in the form of one or more capacitors, like Gold-capacitors or super caps. Regardless of such an integrated storage device in control unit CU, clipping machine CM may be provided with an internally or an externally arranged additional storage device SD. In such a case, recovered energy may be supplied with priority to control unit CU or its integrated storage device, and, after said integrated storage device is fully loaded, recovered electric energy is supplied to drive devices DD of the components of clipping machine CM.

In FIGS. 2 to 7, two drive devices DD for driving components of clipping machine CM are shown, which are connected to DC link 100. However, clipping machine CM may include further drive devices DD connected to DC link 100 for driving further components. These additional components are provided with respective drive devices DD that may also recover electric energy, particularly when operated in the electric braking mode.

It is further possible that clipping machine CM includes only one drive device DD with only one electric motor M for driving all components of clipping machine CM, as a single drive device. Also said single drive device may be adapted to recover energy when operated in the electric braking mode, and to provide said recovered energy via DC link 100 to storage device SD, and to receive the stored energy when operated in the accelerating mode.

Furthermore, in FIGS. 2 to 7, main switch MS for separating clipping machine CM from power grid PG is arranged outside clipping machine CM. However, it is possible that clipping machine CM is provided with an integrated main switch. Alternatively, main switch SM arranged outside clipping machine CM may be provided as an additional main switch.

When arranging clipping machines CM in groups, for using a common storage device SD as shown in FIG. 8, each clipping machine CM is provided with an interface for coupling externally arranged storage device SD via said interface to clipping machine CM. It is further possible that other machines, preferably such machines that are part of a production system for producing sausage-shaped products S, and with which energy can be recovered, like filler 300 arranged upstream clipping machine CM or a hanging line downstream clipping machine CM, may also be coupled to a, preferably common, externally arranged storage device SD, when provide with a respective interface.

REFERENCE SIGNS 10 filling tube
12 left end of the filling tube
14 right end of the filling tube
16 casing brake assembly
20 clipping device
22 first clipping tool
24 second clipping tool
30 gathering means
32 first displayer unit
34 second displacer unit
40 cutting device
50 discharge device
100 DC link
110 control wires
200 power supply line
300 filler
400 interface
500 power cables
A central axis of the filling tube
C closure clip
F feeding direction
L suspension element
M tubular packaging casing
P plait-like portion
S sausage-shaped product
T transportation direction
CM clipping machine
CU control unit
C1 unidirectional DC/DC converter
C2 bidirectional DC/DC converter
C3 bidirectional power converter
R resistor
DD drive device
EM electric motor
FU feed unit
MS main switch
MU motor driver unit
PG power grit
PS power supply
SD storage device

The invention claimed is:

1. A clipping machine for producing sausage-shaped products, by filling a flowable filling material into a tubular or bag-shaped packaging casing and closing said tubular or bag-shaped packaging casing by at least one closure means, the clipping machine comprising:
a filling tube for feeding the filling material into the tubular or bag-shaped packaging casing stored on the filling tube and being closed at its first end,
a casing brake assembly for applying a braking force to the tubular or bag-shaped packaging casing while being pulled-off from the filling tube,
gathering means for gathering the filled tubular or bag-shaped packaging casing and for forming a plait-like portion thereto, the gathering means including a first displacer unit and a second displacer unit,
a clipping device having a first and a second closing tool being reversibly movable between an opened position and a closed position, for applying at least one closure means to the plait-like portion and closing said closure means when the closing tools are in their closed position, and
at least one drive device for driving at least one component of the clipping machine, including at least one electric motor,
the clipping machine further comprises:
a motor driver unit adapted to operate the electric motor in an accelerating mode for increasing the speed of the electric motor, in a driving mode for maintaining the speed of the electric motor, and in an electric braking mode for decreasing the speed of the electric motor; and
a control unit adapted to control the at least one motor driver unit such that during the braking mode electric braking energy is recovered.

2. The clipping machine according to claim 1,
further comprising additional drive devices including further electric motors, for driving further components of the clipping machine, and further motor driver units, wherein the control unit is adapted to operate the plurality of motor driver units such that during a braking mode of one or more of the electric motors, the recovered electric braking energy is supplied to other electric motors operated in the accelerating mode or in the driving mode.

3. The clipping machine according to claim 1,
further comprising:
at least one storage device for storing the recovered electric braking energy.

4. The clipping machine according to claim 3,
wherein the storage device is integrally arranged in the clipping machine, and/or
wherein the storage device is externally arranged to the clipping machine, and
wherein the clipping machine has a connecting port to which the externally arranged storage device may be coupled.

5. The clipping machine according to claim 3,
wherein the control unit is adapted to cause the energy stored in the storage device to be supplied with priority to the control unit.

6. The clipping machine according to claim 3,
wherein the control unit is adapted to cause the energy stored in the storage device to be supplied to at least one of the motor driver units.

7. The clipping machine according to claim 3,
wherein the control unit is adapted to cause the energy stored in the storage device to be preferably supplied to at least one of the electric motors which is operated in the accelerating mode.

8. The clipping machine according to claim 3,
wherein the clipping machine includes at least one sensor device, and wherein the control unit is adapted to cause the energy stored in the storage device to be supplied to the at least one sensor device.

9. The clipping machine according to claim 1,
wherein the control unit is adapted to cause the recovered electric braking energy or the energy stored in the storage device to be supplied to at least one other machine arranged upstream or downstream of the clipping machine, and/or adapted to cause energy recovered within the at least one other machine to be supplied to the clipping machine, preferably to the storage device.

10. The clipping machine according to claim 4,
wherein the externally arranged storage device is adapted to be coupled to further clipping machines.

11. The clipping machine according to claim 1,
wherein the clipping machine comprises a DC link, and wherein the at least one motor driver unit is connected to the DC link.

12. The clipping machine according to claim 1,
wherein the storage device is connected to the DC link via a bidirectional DC/DC converter.

13. A method for controlling a clipping machine for producing sausage-shaped products, by a control unit, the method comprises the steps of:
- feeding filling material into a tubular or bag-shaped packaging casing stored on a filling tube of the clipping machine and being closed at its first end,
- applying a braking force to the bag-shaped packaging casing while being pulled-off from the filling tube, by a casing brake assembly arranged on the filling tube,
- gathering the filled tubular or bag-shaped packaging casing and for forming a plait-like portion thereto by gathering means, the gathering means including a first displacer unit and a second displacer unit,
- applying at least one closure means to the plait-like portion and closing said closure mean, by a clipping device having a first and a second closing tool being reversibly movable between an opened position and a closed position, and
- driving at least one component of the clipping machine by at least one drive device including at least one electric motor, and at least one motor driver unit adapted to operate the electric motor in an accelerating mode for increasing the speed of the electric motor, in a driving mode for maintaining the speed of the electric motor, and in an electric braking mode for decreasing the speed of the electric motor, the method further comprises the step of:
- controlling the at least one motor driver unit such that during the braking mode electric braking energy is recovered.

14. The method of claim 13, further comprising
storing the recovered electric braking energy in a storage device.

15. A system for producing sausage-shaped products, by filling a flowable filling material into a tubular or bag-shaped packaging casing and closing said packaging casing by at least one closure means,
the system comprises:
a clipping machine comprising:
- a filling tube for feeding the filling material into the tubular or bag-shaped packaging casing stored on the filling tube and being closed at its first end,
- a casing brake assembly for applying a braking force to the tubular or bag-shaped packaging casing while being pulled-off from the filling tube,
- gathering means for gathering the filled tubular or bag-shaped packaging casing and for forming a plait-like portion thereto, the gathering means including a first displacer unit and a second displacer unit,
- a clipping device having a first and a second closing tool being reversibly movable between an opened position and a closed position, for applying at least one closure means to the plait-like portion and closing said closure means when the closing tools are in their closed position, and
- at least one drive device for driving at least one component of the clipping machine, including at least one electric motor, the clipping machine further comprises:
- a motor driver unit adapted to operate the electric motor in an accelerating mode for increasing the speed of the electric motor, in a driving mode for maintaining the speed of the electric motor, and in an electric braking mode for decreasing the speed of the electric motor; and
- a control unit adapted to control the at least one motor driver unit such that during the braking mode electric braking energy is recovered; and
at least one further production machine,
the system being controlled by the method according to claim 13.

* * * * *